United States Patent
Kinsel

(10) Patent No.: US 11,239,648 B2
(45) Date of Patent: Feb. 1, 2022

(54) SENSING A HIGH FREQUENCY ARC NOISE IN AN ARC FAULT DETECTION CIRCUIT INTERRUPTION (AFCI) DEVICE

(71) Applicant: Siemens Industry, Inc., Alpharetta, GA (US)

(72) Inventor: Hugh T. Kinsel, Sugar Hill, GA (US)

(73) Assignee: SIEMENS INDUSTRY, INC, Alpharetta, GA (US)

( * ) Notice: Subject to any disclaimer, the term of this patent is extended or adjusted under 35 U.S.C. 154(b) by 0 days.

(21) Appl. No.: 16/828,270

(22) Filed: Mar. 24, 2020

(65) Prior Publication Data
US 2021/0305801 A1 Sep. 30, 2021

(51) Int. Cl.
*H02H 3/08* (2006.01)
*H01C 7/108* (2006.01)
*H02H 1/00* (2006.01)

(52) U.S. Cl.
CPC ............ *H02H 3/08* (2013.01); *H01C 7/108* (2013.01); *H02H 1/0015* (2013.01)

(58) Field of Classification Search
CPC ......... H02H 3/08; H02H 1/0015; H01C 7/108
USPC ....................................................... 361/93.1
See application file for complete search history.

(56) References Cited

U.S. PATENT DOCUMENTS

| 2001/0005322 | A1* | 6/2001 | Uchida | H02M 1/34 363/97 |
| 2004/0042137 | A1 | 3/2004 | Wong et al. | |
| 2009/0184787 | A1* | 7/2009 | Weeks | H01H 71/58 335/18 |
| 2011/0242711 | A1* | 10/2011 | Morgan | H01H 83/144 361/42 |
| 2017/0269139 | A1 | 9/2017 | Schmalz et al. | |

OTHER PUBLICATIONS

J. R. Nicholson and J. A. Malack / RF Impedance of Power Lines and Line Impedance Stabilization Networks in Conducted Interference Measurements, May 1973.

* cited by examiner

*Primary Examiner* — Thienvu V Tran
*Assistant Examiner* — Sreeya Sreevatsa

(57) ABSTRACT

An arc fault detection circuit interruption (AFCI) device includes a high frequency arc noise sensor and an arc fault detection circuit for sensing a high frequency arc noise. The high frequency arc noise sensor is disposed across a hot conductor and a neutral conductor and includes a surge protection device and a surge protection circuit such that the surge protection device protects against a first voltage surge in a first range of thousands to hundreds volts and the surge protection circuit protects against a second voltage surge in a second range of hundreds to few volts. The arc fault detection circuit is coupled in series with the high frequency arc noise sensor. The arc fault detection circuit is coupled to a series combination of a trip solenoid or electromagnet and a silicone-controlled rectifier disposed across the hot conductor and the neutral conductor.

18 Claims, 3 Drawing Sheets

FIG. 5

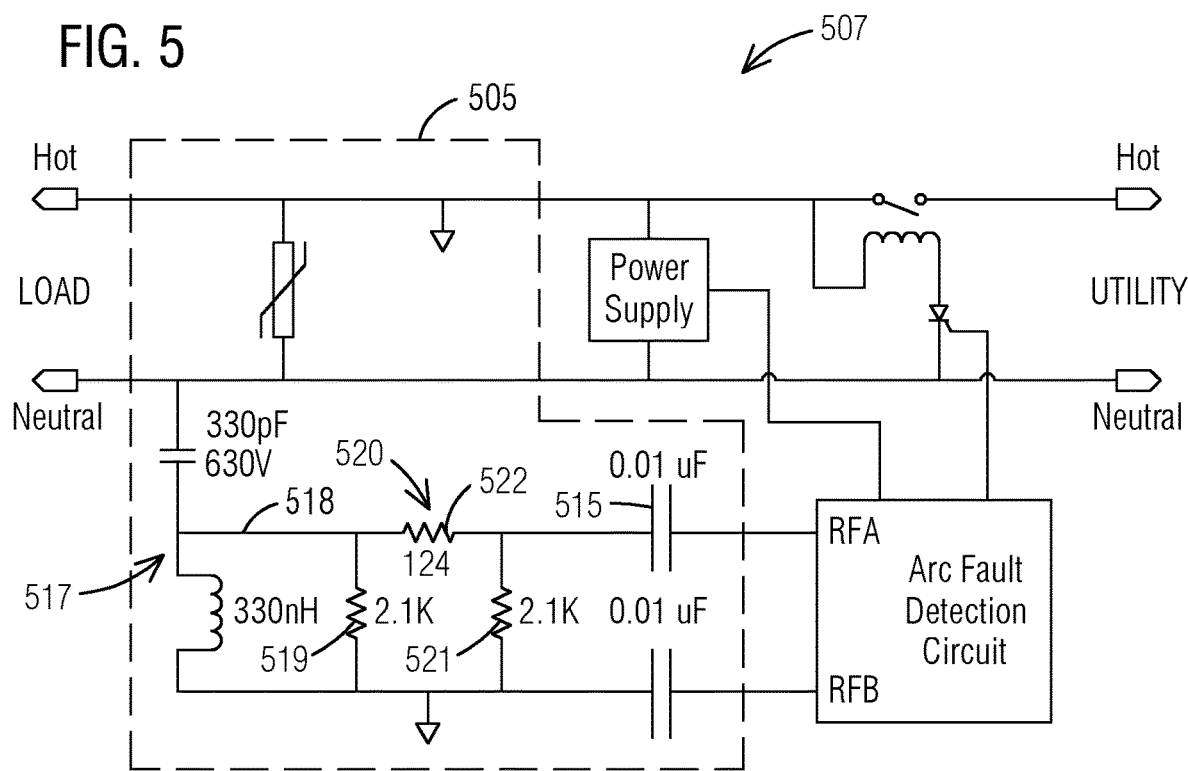

FIG. 6

Provide a high frequency arc noise sensor disposed across a hot conductor and a neutral conductor for sensing a high frequency arc noise in an arc fault detection circuit interruption (AFCI) device, wherein the high frequency arc noise sensor includes a surge protection device across the hot conductor and the neutral conductor and a surge protection circuit such that the surge protection device protects against a first voltage surge in a first range of thousands to hundreds of volts and the surge protection circuit protects against a second voltage surge in a second range of hundreds to few volts Provide an arc fault detection circuit coupled in series with the high frequency arc noise sensor, wherein the arc fault detection circuit is coupled to a series combination of a trip solenoid or electromagnet and a silicone-controlled rectifier disposed across the hot conductor and the neutral conductor

SENSING A HIGH FREQUENCY ARC NOISE IN AN ARC FAULT DETECTION CIRCUIT INTERRUPTION (AFCI) DEVICE

BACKGROUND

1. Field

Aspects of the present invention generally relate to sensing a high frequency arc noise in an arc fault detection circuit interruption (AFCI) device.

2. Description of the Related Art

Beginning January 2008, UL1699 requires that all electrical circuit branches in living spaces be protected with low current arc fault circuit interrupters as well as the existing high current circuit interrupters. Such circuit interrupters are referred to as Combination Arc Fault Circuit Interrupters or CAFCI. The high current arc fault circuit interrupters referred to as AFCI or branch feeder circuit interrupters simply sense and analyze the load current to determine if there is arcing present from hot to neutral or from hot to ground in the wiring of a circuit branch. However, in the case of low current arcs where the arc is in series with the load, other methods of sensing and detecting this type of arc are required because the load current often times masks the ability to detect this type of arc. So, an alternative method to detecting series arcs is to sense the higher frequency noise generated by the low current arc in series with the load. In general, the intensity of the noise generated by the low current arc decreases as the frequency increases from 100 kHz up to about 25 or 30 MHz, but even more so does the intensity of noise generated by various loads on the electrical branch. So, it is somewhat advantageous to sense the noise generated by a low current arc at higher RF frequencies. However, sensing this arc fault noise does have its challenges.

The first challenge is that a metal-oxide varistor or MOV is required to protect the arc fault detection electronic circuits from high amplitude short duration current and voltage surges. The MOV inherently has some capacitance associated with it ranging from a few hundred picofarads to one-thousand picofarads that attenuates high frequency noise. This is usually a good characteristic to have but not when it is desired to sense the noise generated by a low current arc at higher RF frequencies. Although the MOV does serve to shunt several thousand amps of surge current and clamps the surge voltages to amplitudes in the range of 600 to 880 volts, it is still not sufficient to protect the signal conditioning electronics. So, the second challenge is that the RF sensor must provide additional protection from voltage surges. The third challenge is that the sensor must also provide adequate protection from the 120 VAC line voltage of the electrical power distribution system for residential circuit branches. Of course, the fourth challenge is to meet the first three challenges in the most efficient or economical way from the standpoint of size and cost.

These challenges have been attempted to be met by using a transformer. But the use of a transformer typically does not address the attenuation of the high frequency noise signal by the MOV and is not the most efficient method in terms of size and cost. This invention discloses an alternative solution that successfully addresses the first three technical challenges in a manner that is smaller in size and is significantly lower in cost.

Therefore, there is a need for properly and efficiently sensing a high frequency arc noise in an arc fault detection circuit interruption (AFCI) device.

SUMMARY

Briefly described, aspects of the present invention relate to a high frequency arc noise sensor contained in a low current or otherwise named an arc fault detection device. The arc fault detection device may be contained within a larger embodiment encompassing a circuit interrupting apparatus with additional features such as high current arc fault detection, electronic over current detection, and ground fault detection, some or all features combined into a single device. The invention replaces a RF transformer with an equivalent tapped capacitor transformer circuit in a high frequency arc noise sensor of arc fault detection devices. Moreover, the invention incorporates a Metal Oxide Varistor (MOV) needed for electronic circuit protection against high voltage surges as capacitor C1 and a high voltage coupling capacitor as C2 in the tapped capacitor transformer circuit. A small inductor L is placed in parallel to tune the circuit to the frequencies of interest.

In accordance with one illustrative embodiment of the present invention, an arc fault detection circuit interruption (AFCI) device comprises a high frequency arc noise sensor disposed across a hot conductor and a neutral conductor. The high frequency arc noise sensor includes a surge protection device across the hot conductor and the neutral conductor and a surge protection circuit such that the surge protection device protects against a first voltage surge in a first range of thousands to hundreds volts and the surge protection circuit protects against a second voltage surge in a second range of hundreds to few volts. The arc fault detection circuit interruption (AFCI) device comprises an arc fault detection circuit coupled in series with the high frequency arc noise sensor. The arc fault detection circuit is coupled to a series combination of a trip solenoid or electromagnet and a silicone-controlled rectifier disposed across the hot conductor and the neutral conductor.

In accordance with one illustrative embodiment of the present invention, a method of sensing a high frequency arc noise in an arc fault detection circuit interruption (AFCI) device is provided. The method comprises providing a high frequency arc noise sensor disposed across a hot conductor and a neutral conductor. The high frequency arc noise sensor includes a surge protection device across the hot conductor and the neutral conductor and a surge protection circuit such that the surge protection device protects against a first voltage surge in a first range of thousands to hundreds volts and the surge protection circuit protects against a second voltage surge in a second range of hundreds to few volts. The method further comprises providing an arc fault detection circuit coupled in series with the high frequency arc noise sensor. The arc fault detection circuit is coupled to a series combination of a trip solenoid or electromagnet and a silicone-controlled rectifier disposed across the hot conductor and the neutral conductor.

BRIEF DESCRIPTION OF THE DRAWINGS

FIG. 5 illustrates a schematic view of a high frequency arc noise sensor of an arc fault detection circuit interruption (AFCI) device in that a resistive attenuator is arranged in a "Pi" configuration between the output of a tapped capacitor transformer circuit and a coupling capacitor in accordance with an exemplary embodiment of the present invention.

FIG. 6 illustrates a schematic view of a flow chart of a method of sensing a high frequency arc noise in an arc fault detection circuit interruption (AFCI) device in accordance with an exemplary embodiment of the present invention.

DETAILED DESCRIPTION

Figure 1:
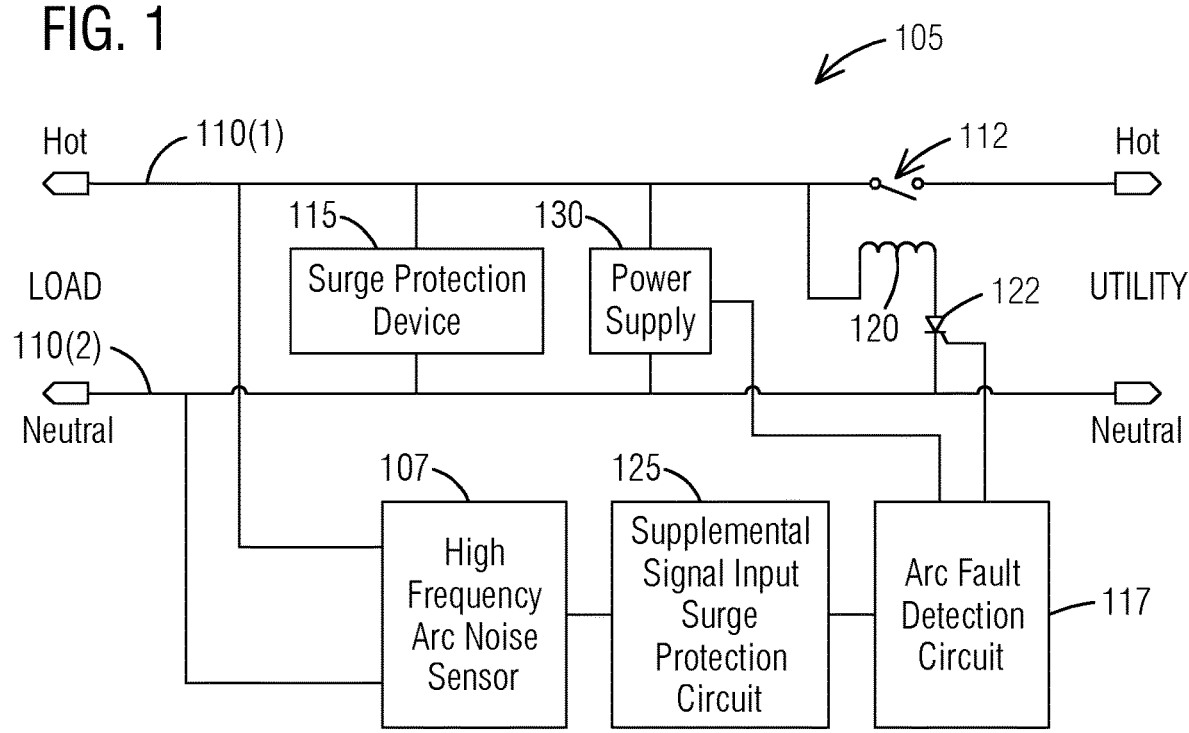
FIG. 1 illustrates a schematic view of an arc fault detection circuit interruption (AFCI) device with a high frequency arc noise sensor in accordance with an exemplary embodiment of the present invention.

To facilitate an understanding of embodiments, principles, and features of the present invention, they are explained hereinafter with reference to implementation in illustrative embodiments. In particular, they are described in the context of a high frequency arc noise sensor of an arc fault detection circuit interruption (AFCI) device with a tapped capacitor transformer circuit. A surge protection device such as the MOV serves to shunt several thousand amps of surge current and clamps the surge voltages to amplitudes in the range of 600 to 880 volts. To protect the signal conditioning electronics a RF sensor provides additional protection from voltage surges. The RF sensor also provides adequate protection from the 120 VAC line voltage of the electrical power distribution system for residential circuit branches. Embodiments of the present invention, however, are not limited to use in the described devices or methods.

The components and materials described hereinafter as making up the various embodiments are intended to be illustrative and not restrictive. Many suitable components and materials that would perform the same or a similar function as the materials described herein are intended to be embraced within the scope of embodiments of the present invention.

These and other embodiments of the high frequency arc noise sensor according to the present disclosure are described below with reference to FIGS. 1-6 herein. Like reference numerals used in the drawings identify similar or identical elements throughout the several views. The drawings are not necessarily drawn to scale.

Consistent with one embodiment of the present invention, FIG. 1 represents a schematic view of an arc fault detection circuit interruption (AFCI) device 105 with a high frequency arc noise sensor 107 in accordance with an exemplary embodiment of the present invention. The arc fault detection circuit interruption (AFCI) device 105 consists of the high frequency arc noise sensor 107, a hot conductor 110(1), a neutral conductor 110(2), a main contact switch 112, a surge protection device such as a metal oxide varistor (MOV) 115, an arc fault detection circuit 117, a trip solenoid or electromagnet 120, and a Silicone-Controlled Rectifier (SCR) 122.

The high frequency arc noise sensor 107 couples high frequency RF noise on conductors 110(1) and 110(2) into the arc fault detection circuit 117.

The arc fault detection circuit 117 is coupled in series with the high frequency arc noise sensor 107. The arc fault detection circuit 117 is coupled to a series combination of the trip solenoid or electromagnet 120 and the silicone-controlled rectifier 122 disposed across the hot conductor 110(1) and the neutral conductor 110(2).

In the arc fault detection circuit interruption (AFCI) device 105, the high frequency arc noise sensor 107 is disposed across the hot conductor 110(1) and the neutral conductor 110(2). The high frequency arc noise sensor 107 includes the surge protection device 115 (shown separately in FIG. 1) across the hot conductor 110(1) and the neutral conductor 110(2) and a surge protection circuit such as the supplemental signal input surge protection circuit 125 (shown separately in FIG. 1) such that the surge protection device 115 protects against a first voltage surge in a first range of thousands to hundreds volts (e.g., 6000V to 600V) and the surge protection circuit 125 protects against a second voltage surge in a second range of hundreds to few volts (e.g., 600V to 2V).

Upon detection of an arc, the arc fault detection circuit 117 applies a trip signal to the gate of the SCR 122 which turns on and energizes solenoid/electromagnet 120. The solenoid/electromagnet 120 is mechanically coupled to open main contact switch 112 removing power to the load from the utility. The MOV 115 is necessary to protect the electronics from high voltage-high current surges on the hot conductor 110(1). The supplemental signal input surge protection circuit 125 is provided in series between the high frequency arc noise sensor 107 and the arc fault detection circuit 117. A power supply 130 is connected across the hot conductor 110(1) and the neutral conductor 110(2) and it also powers the arc fault detection circuit 117.

Figure 2:
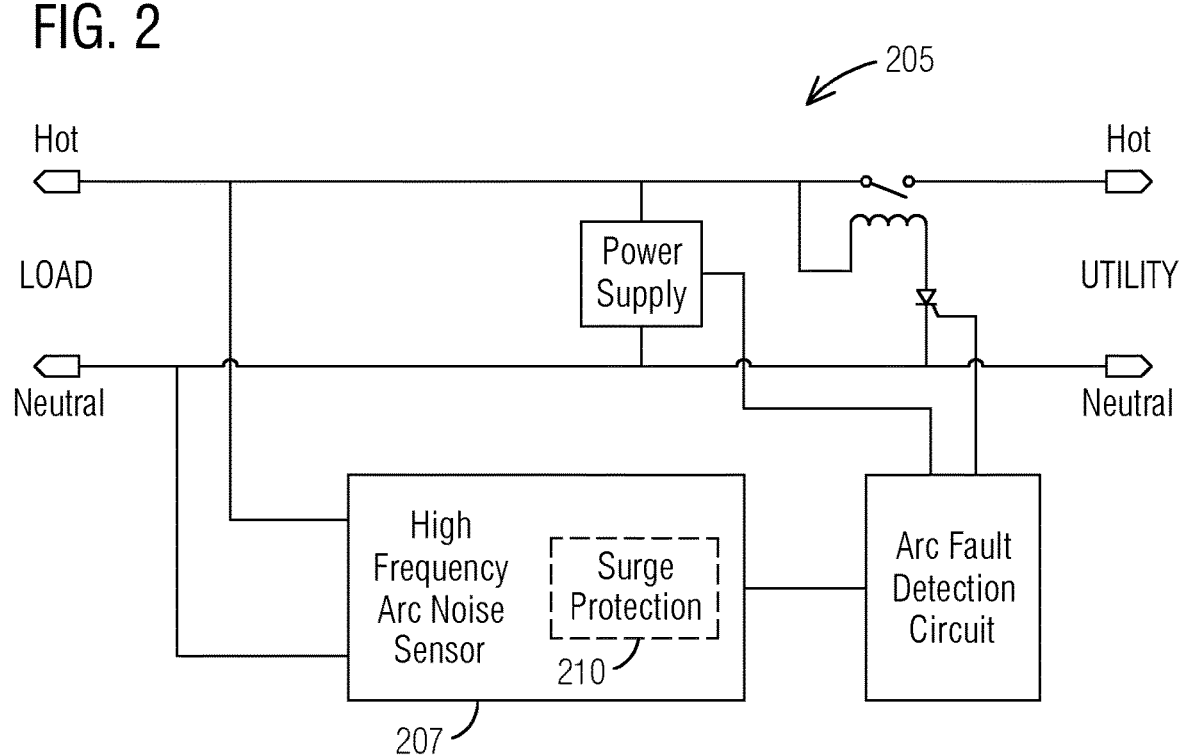
FIG. 2 illustrates a schematic view of an arc fault detection circuit interruption (AFCI) device with a high frequency arc noise sensor in accordance with an alternate embodiment of the present invention.

Referring to FIG. 2, it illustrates a schematic view of an arc fault detection circuit interruption (AFCI) device 205 with a high frequency arc noise sensor 207 in accordance with an alternate embodiment of the present invention. A surge protection 210 is provided integral to the high frequency arc noise sensor 207.

Figure 3:
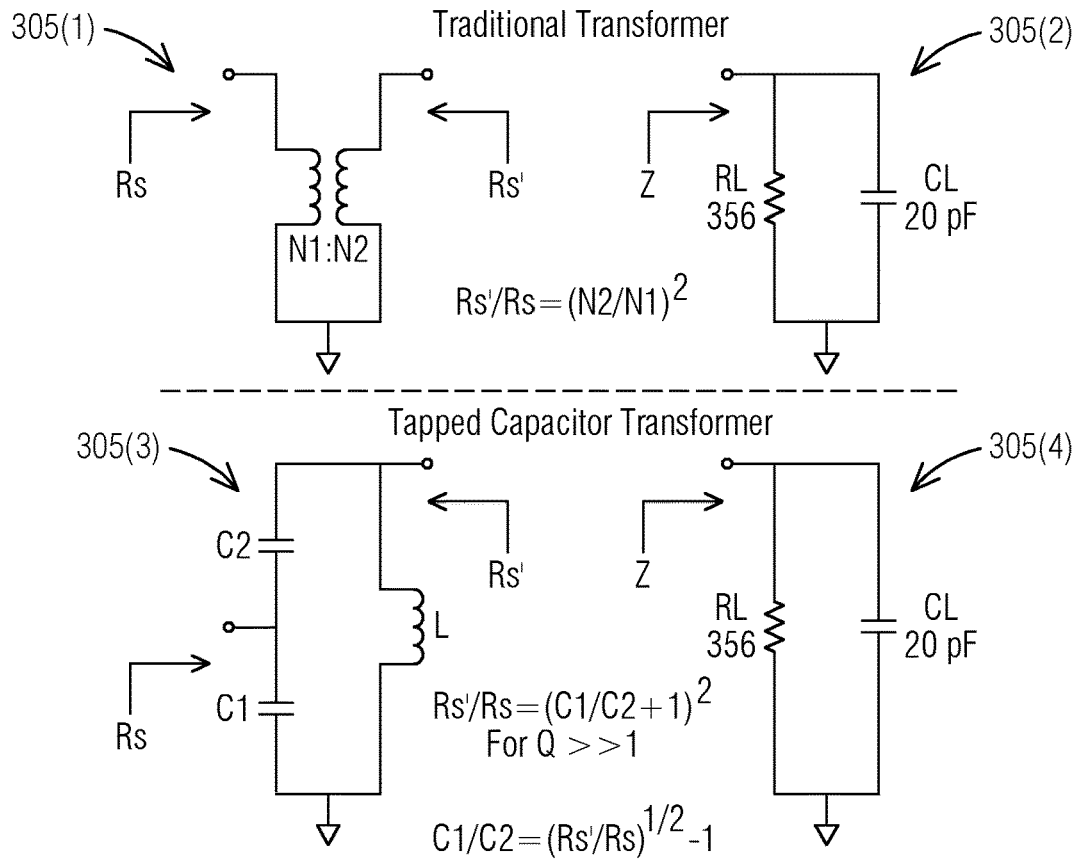
FIG. 3 illustrates equivalent circuits of a traditional transformer and a tapped capacitor transformer circuit in accordance with an exemplary embodiment of the present invention.

Turning now to FIG. 3, it illustrates equivalent circuits 305(1-4) of a traditional transformer and a tapped capacitor transformer circuit in accordance with an exemplary embodiment of the present invention. The Metal Oxide Varistor or MOV needed for electronic circuit protection against high voltage surges is C1 and the high voltage coupling capacitor is C2 in the tapped capacitor transformer circuit. A small inductor L is placed in parallel to tune the circuit to the frequencies of interest.

Figure 4:
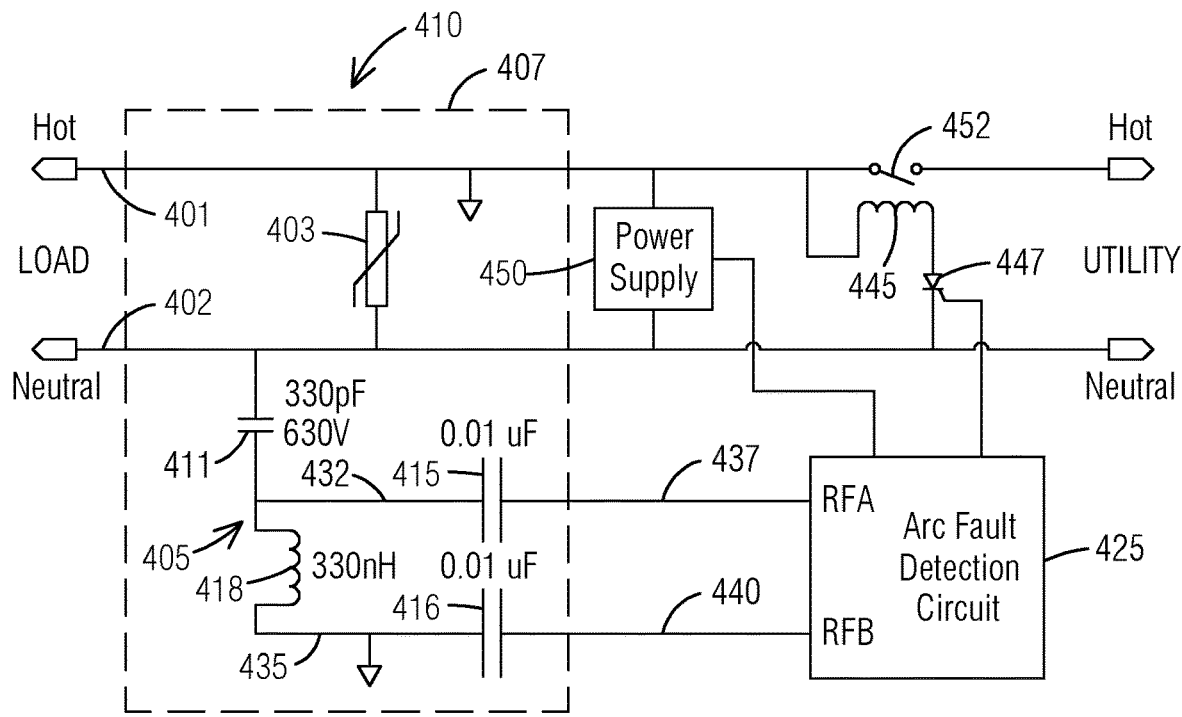
FIG. 4 illustrates a schematic view of an equivalent tapped capacitor transformer circuit in a high frequency arc noise sensor of an arc fault detection circuit interruption (AFCI) device in accordance with an exemplary embodiment of the present invention.

FIG. 4 illustrates a schematic view of an equivalent tapped capacitor transformer circuit 405 in a high frequency arc noise sensor 407 of an arc fault detection circuit interruption (AFCI) device 410 in accordance with an exemplary embodiment of the present invention. The high frequency arc noise sensor 407 in the embodiment shown in FIG. 4 consists of a surge protection device such as a Metal Oxide Varistor (MOV) 403, a high voltage capacitor 411, a shunt inductor 418 to tune the circuit to the frequencies of interest, and coupling capacitors 415 and 416. The sensor 407 functions by coupling the high frequency noise generated by an arc through a tapped capacitor transformer formed by the shunt capacitance of the MOV 403, specifically ERZE11A391 manufactured by Panasonic which has 380 pF of capacitance, and the high voltage 330 pF capacitor 411, specifically CC1206JKNPOZBN331 manufactured by Yageo, which is tuned to around 21 MHz with the 330 nH shunt inductor 418, specifically LQM21NNR33K10D manufactured by MuRata. The inductor 418 also serves to form a band pass filter with about 6 MHz bandwidth centered at the frequencies of interest. The output of the tapped capacitor transformer is coupled to an arc fault detection circuit 425 through the 0.01 uF coupling capacitor 415, specifically CC0402KRX7R7BB103 manufactured by Yageo. This capacitor also provides a DC open circuit to the input port of the arc fault detection circuit 425 which prevents disruption of any DC bias voltage that typically exists on an input port (RFA) of the arc fault detection circuit 425. The other 0.01 uF capacitor 416, specifically CC0402KRX7R7BB103 manufactured by Yageo, provides coupling of the other input port (RFB) to the reference conductor which is a hot conductor 401 in this embodiment. This capacitor 416 also provides a DC open circuit to the other input port (RFB) of the arc fault detection circuit 425 which prevents disruption of any DC bias voltage that typically exists on an input port (RFB) of the arc fault detection circuit 425. The arc fault detection circuit 425 input shown in this embodiment is a single ended configuration. Also note that the hot conductor 401 and a neutral conductor 402 can be swapped in this embodiment. This invention is not limited to the frequencies and impedances described in this invention. Someone skilled in the art can readily modify this invention for alternate frequencies and impedances.

The arc fault detection circuit 425 is coupled in series with the high frequency arc noise sensor 407. The arc fault detection circuit 425 is coupled to a series combination of a trip solenoid or electromagnet 445 and a silicone-controlled rectifier 447 disposed across the hot conductor 401 and the neutral conductor 402. A power supply 450 is connected across the hot conductor 401 and the neutral conductor 402 and it also powers the arc fault detection circuit 425. The arc fault detection circuit interruption (AFCI) device 410 consists of a main contact switch 452.

The high frequency arc noise sensor 407 includes a surge protection circuit such as the tapped capacitor transformer circuit 405 having a first output 432 and a second output 435 such that the first output 432 having a first coupling capacitor 415 in series and the second output 435 having a second coupling capacitor 416 in series. The arc fault detection circuit 425 includes a first input port 437 and a second input port 440 such that the first coupling capacitor 415 is coupled to the first input port 437 in series and the second coupling capacitor 416 is coupled to the second input port 440 in series.

The tapped capacitor transformer circuit 405 matches an impedance at a RF input pin of the arc fault detection circuit 425 to around 75 Ohms which is in middle of a minimum and a maximum impedance range of power lines at around 21 MHz to produce a quality arc fault output power signal. The tapped capacitor transformer circuit 405 provides a 2-pole band pass filter centered at 21 MHz with a bandwidth of about 6 MHz. The tapped capacitor transformer circuit eliminates 120 VAC from imposing on a RF input pin of the arc fault detection circuit 425.

The tapped capacitor transformer circuit 405 minimizes exposure of input ports of the arc fault detection circuit 425 to harmful high voltage or current transient surge environment that exists on a power line. The capacitance of the surge protection device 403 from the hot conductor 401 to the neutral conductor 402 that normally attenuates high frequency noise generated by an arc fault is integrated into the tapped capacitor transformer circuit 405 and therefore does not attenuate the high frequency noise generated by the arc fault. The tapped capacitor transformer circuit 405 eliminates any need for an additional capacitor from the hot conductor 401 to the neutral conductor 402 that attenuates Power Line Carrier (PLC) transmissions.

As seen in FIG. 5, it illustrates a schematic view of a high frequency arc noise sensor 505 of an arc fault detection circuit interruption (AFCI) device 507 in that a resistive attenuator 520 is arranged in a "Pi" configuration between an output 518 of a tapped capacitor transformer circuit 517 and a first coupling capacitor 515 in accordance with an exemplary embodiment of the present invention. A resistive attenuator may otherwise be arranged in a "Tee" configuration between the output 518 of the tapped capacitor transformer circuit 517 and the first coupling capacitor 515. The values of resistors in the resistive attenuator 520 are calculated for an attenuation of 3 dB and an input and output resistance of 350 Ohms. The values for the resistors of the resistive attenuator 520 are 2.1 Kilo-Ohms for shunt resistors 519, 521 and 124 Ohms for a series resistor 522.

A small amount of arc noise output signal power is sacrificed for added protection to prevent high voltage noise spikes from damaging the input of the arc fault detection circuit 425 and added stability in impedance matching of the tapped capacitor transformer from unit to unit over high volume production. This alternate embodiment of the invention is not limited to the attenuation and impedance or resistance described in this invention. Someone skilled in the art can readily modify this invention for alternate attenuation and impedances or resistances.

As shown in FIG. 6, it illustrates a schematic view of a flow chart of a method 605 of sensing a high frequency arc noise in an arc fault detection circuit interruption (AFCI) device in accordance with an exemplary embodiment of the present invention. Reference is made to the elements and features described in FIGS. 1-5. It should be appreciated that some steps are not required to be performed in any particular order, and that some steps are optional.

The method 605 comprises a step 610 of providing a high frequency arc noise sensor disposed across a hot conductor and a neutral conductor. The high frequency arc noise sensor includes a surge protection device across the hot conductor and the neutral conductor and a surge protection circuit such that the surge protection device protects against a first voltage surge in a first range of thousands to hundreds volts and the surge protection circuit protects against a second voltage surge in a second range of hundreds to few volts. The method 605 comprises a step 615 of providing an arc fault detection circuit coupled in series with the high frequency arc noise sensor. The arc fault detection circuit is coupled to a series combination of a trip solenoid or electromagnet and a silicone-controlled rectifier disposed across the hot conductor and the neutral conductor.

The invention is important to CAFCI circuit breakers in that it saves cost. In addition, it is crucial for the CAFCI twin breaker due to the reduction in size of the sensor circuit. Without it, the electronics would not likely fit in the limited space available in the twin breaker.

While a tapped capacitor transformer circuit is described here a range of one or more other alternates to a RF transformer or other forms of equivalent circuits are also contemplated by the present invention. For example, other types of equivalent circuits may be implemented based on one or more features presented above without deviating from the spirit of the present invention.

The techniques described herein can be particularly useful for a Metal Oxide Varistor (MOV). While particular embodiments are described in terms of a Metal Oxide Varistor (MOV), the techniques described herein are not limited to such a surge protection device but can also be used with other surge protection devices or configurations.

While embodiments of the present invention have been disclosed in exemplary forms, it will be apparent to those skilled in the art that many modifications, additions, and deletions can be made therein without departing from the spirit and scope of the invention and its equivalents, as set forth in the following claims.

Embodiments and the various features and advantageous details thereof are explained more fully with reference to the non-limiting embodiments that are illustrated in the accompanying drawings and detailed in the following description. Descriptions of well-known starting materials, processing techniques, components and equipment are omitted so as not to unnecessarily obscure embodiments in detail. It should be understood, however, that the detailed description and the specific examples, while indicating preferred embodiments, are given by way of illustration only and not by way of limitation. Various substitutions, modifications, additions and/or rearrangements within the spirit and/or scope of the underlying inventive concept will become apparent to those skilled in the art from this disclosure.

As used herein, the terms "comprises," "comprising," "includes," "including," "has," "having" or any other variation thereof, are intended to cover a non-exclusive inclusion. For example, a process, article, or apparatus that comprises a list of elements is not necessarily limited to only those elements but may include other elements not expressly listed or inherent to such process, article, or apparatus.

Additionally, any examples or illustrations given herein are not to be regarded in any way as restrictions on, limits to, or express definitions of, any term or terms with which they are utilized. Instead, these examples or illustrations are to be regarded as being described with respect to one particular embodiment and as illustrative only. Those of ordinary skill in the art will appreciate that any term or terms with which these examples or illustrations are utilized will encompass other embodiments which may or may not be given therewith or elsewhere in the specification and all such embodiments are intended to be included within the scope of that term or terms.

In the foregoing specification, the invention has been described with reference to specific embodiments. However, one of ordinary skill in the art appreciates that various modifications and changes can be made without departing from the scope of the invention. Accordingly, the specification and figures are to be regarded in an illustrative rather than a restrictive sense, and all such modifications are intended to be included within the scope of invention.

Although the invention has been described with respect to specific embodiments thereof, these embodiments are merely illustrative, and not restrictive of the invention. The description herein of illustrated embodiments of the invention is not intended to be exhaustive or to limit the invention to the precise forms disclosed herein (and in particular, the inclusion of any particular embodiment, feature or function is not intended to limit the scope of the invention to such embodiment, feature or function). Rather, the description is intended to describe illustrative embodiments, features and functions in order to provide a person of ordinary skill in the art context to understand the invention without limiting the invention to any particularly described embodiment, feature or function. While specific embodiments of, and examples for, the invention are described herein for illustrative purposes only, various equivalent modifications are possible within the spirit and scope of the invention, as those skilled in the relevant art will recognize and appreciate. As indicated, these modifications may be made to the invention in light of the foregoing description of illustrated embodiments of the invention and are to be included within the spirit and scope of the invention. Thus, while the invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the invention.

Respective appearances of the phrases "in one embodiment," "in an embodiment," or "in a specific embodiment" or similar terminology in various places throughout this specification are not necessarily referring to the same embodiment. Furthermore, the particular features, structures, or characteristics of any particular embodiment may be combined in any suitable manner with one or more other embodiments. It is to be understood that other variations and modifications of the embodiments described and illustrated herein are possible in light of the teachings herein and are to be considered as part of the spirit and scope of the invention.

In the description herein, numerous specific details are provided, such as examples of components and/or methods, to provide a thorough understanding of embodiments of the invention. One skilled in the relevant art will recognize, however, that an embodiment may be able to be practiced without one or more of the specific details, or with other apparatus, systems, assemblies, methods, components, materials, parts, and/or the like. In other instances, well-known structures, components, systems, materials, or operations are not specifically shown or described in detail to avoid obscuring aspects of embodiments of the invention. While the invention may be illustrated by using a particular embodiment, this is not and does not limit the invention to any particular embodiment and a person of ordinary skill in the art will recognize that additional embodiments are readily understandable and are a part of this invention.

It will also be appreciated that one or more of the elements depicted in the drawings/figures can also be implemented in a more separated or integrated manner, or even removed or rendered as inoperable in certain cases, as is useful in accordance with a particular application.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component.

What is claimed is:

1. An arc fault detection circuit interruption (AFCI) device, comprising:
  a high frequency arc noise sensor disposed across a hot conductor and a neutral conductor,
  wherein the high frequency arc noise sensor includes a surge protection device across the hot conductor and the neutral conductor and a surge protection circuit such that the surge protection device protects against a first voltage surge in a first range of thousands to hundreds volts and the surge protection circuit protects against a second voltage surge in a second range of hundreds to few volts; and an arc fault detection circuit coupled in series with the high frequency arc noise sensor, wherein the arc fault detection circuit is coupled to a series combination of a trip solenoid or electromagnet and a silicone-controlled rectifier disposed across the hot conductor and the neutral conductor, and wherein the surge protection circuit includes a tapped capacitor transformer circuit having a first output and a second output such that the first output having a first coupling capacitor in series and the second output having a second coupling capacitor in series.

2. The arc fault detection circuit interruption (AFCI) device of claim 1, wherein the surge protection device is a metal oxide varistor.

3. The arc fault detection circuit interruption (AFCI) device of claim 1, wherein the arc fault detection circuit includes a first input port and a second input port such that the first coupling capacitor is coupled to the first input port in series and the second coupling capacitor is coupled to the second input port in series.

4. The arc fault detection circuit interruption (AFCI) device of claim 3, wherein the tapped capacitor transformer circuit matches an impedance at a Radio Frequency (RF) input pin of the arc fault detection circuit to around 75 Ohms which is in middle of a minimum and a maximum impedance range of power lines at around 21 MHz to produce a quality arc fault output power signal.

5. The arc fault detection circuit interruption (AFCI) device of claim 3, wherein the tapped capacitor transformer circuit provides a 2-pole band pass filter centered at 21 MHz with a bandwidth of about 6 MHz.

6. The arc fault detection circuit interruption (AFCI) device of claim 3, wherein the tapped capacitor transformer circuit eliminates 120 VAC from imposing on a Radio Frequency (RF) input pin of the arc fault detection circuit.

7. The arc fault detection circuit interruption (AFCI) device of claim 3, wherein the tapped capacitor transformer circuit minimizes exposure of input ports of the arc fault detection circuit to harmful high voltage or current transient surge environment that exists on a power line.

8. The arc fault detection circuit interruption (AFCI) device of claim 3, wherein a capacitance of the surge protection device from the hot conductor to the neutral conductor that normally attenuates high frequency noise generated by an arc fault is integrated into the tapped capacitor transformer circuit and therefore does not attenuate the high frequency noise generated by the arc fault.

9. The arc fault detection circuit interruption (AFCI) device of claim 3, wherein the tapped capacitor transformer circuit eliminates any need for an additional capacitor from the hot conductor to the neutral conductor that attenuates Power Line Carrier (PLC) transmissions.

10. The arc fault detection circuit interruption (AFCI) device of claim 3, wherein a resistive attenuator arranged in a "Pi" or "Tee" configuration is added between an output of the tapped capacitor transformer circuit and the first coupling capacitor.

11. The arc fault detection circuit interruption (AFCI) device of claim 10, wherein values of resistors in the resistive attenuator are calculated for an attenuation of 3 dB and an input and output resistance of 350 Ohms.

12. The arc fault detection circuit interruption (AFCI) device of claim 11, wherein the values for the resistors of the resistive attenuator are 2.1 Kilo-Ohms for shunt resistors and 124 Ohms for series resistor.

13. A method of sensing a high frequency arc noise in an arc fault detection circuit interruption (AFCI) device, the method comprising:

providing a high frequency arc noise sensor disposed across a hot conductor and a neutral conductor, wherein the high frequency arc noise sensor includes a surge protection device across the hot conductor and the neutral conductor and a surge protection circuit such that the surge protection device protects against a first voltage surge in a first range of thousands to hundreds volts and the surge protection circuit protects against a second voltage surge in a second range of hundreds to few volts; and providing an arc fault detection circuit coupled in series with the high frequency arc noise sensor, wherein the arc fault detection circuit is coupled to a series combination of a trip solenoid or electromagnet and a silicone-controlled rectifier disposed across the hot conductor and the neutral conductor, and wherein the surge protection circuit includes a tapped capacitor transformer circuit having a first output and a second output such that the first output having a first coupling capacitor in series and the second output having a second coupling capacitor in series.

14. The method of claim 13, wherein the surge protection device is a metal oxide varistor.

15. The method of claim 13, wherein the arc fault detection circuit includes a first input port and a second input port such that a first coupling capacitor is coupled to the first input port in series and a second coupling capacitor is coupled to the second input port in series.

16. The method of claim 13, wherein the tapped capacitor transformer circuit matches an impedance at a Radio Frequency (RF) input pin of the arc fault detection circuit to around 75 Ohms which is in middle of a minimum and a maximum impedance range of power lines at around 21 MHz to produce a quality arc fault output power signal.

17. The method of claim 13, wherein the tapped capacitor transformer circuit provides a 2-pole band pass filter centered at 21 MHz with a bandwidth of about 6 MHz.

18. The method of claim 13, wherein the tapped capacitor transformer circuit eliminates 120 VAC from imposing on a Radio Frequency (RF) input pin of the arc fault detection circuit.

* * * * *